United States Patent [19]

Granberg et al.

[11] 3,969,639
[45] July 13, 1976

[54] TRANSMISSION LINE DRIVER CIRCUIT

[75] Inventors: Mauritz L. Granberg, Richfield; Howard N. Hanson, Minneapolis; Robert L. Rajala, Blaine; William G. Whipple, Burnsville, all of Minn.

[73] Assignee: Sperry Rand Corporation, New York, N.Y.

[22] Filed: Dec. 13, 1974

[21] Appl. No.: 532,336

[52] U.S. Cl. .............................. 307/270; 307/254; 307/241
[51] Int. Cl.² ........................................ H03K 17/56
[58] Field of Search .......... 307/270, 254, 255, 241; 333/80 T, 7, 10

[56] References Cited
UNITED STATES PATENTS

| | | | |
|---|---|---|---|
| 3,358,216 | 12/1967 | Kostuch | 307/270 |
| 3,581,112 | 5/1971 | Laderach | 307/241 |

OTHER PUBLICATIONS
IBM Tech. Disc. Bull., Bipolar Transmission Line Driver, R. O. Hippert, vol. No. 12, May 1969, p. 1765.

Primary Examiner—Stanley D. Miller, Jr.
Assistant Examiner—B. P. Davis
Attorney, Agent, or Firm—Thomas J. Nikolai; Kenneth T. Grace; Marshall M. Truex

[57] ABSTRACT

A transmission line driver circuit especially designed for transmitting nonsymmetrical codes wherein signals to be transmitted are coupled to the lines by means of first and second transformers. A pair of digital logic circuits are connected to said first and second transformers such that positive going pulse signals are transmitted by way of the first transformer and negative going pulses are transmitted by way of the second transformer. Further circuitry is provided for discharging the energy stored in the magnetic field on the first transformer when the second transformer is coupling a pulse to the line and vice versa.

5 Claims, 2 Drawing Figures

TRANSMISSION LINE DRIVER CIRCUIT

BACKGROUND OF THE INVENTION

This invention relates generally to a driver circuit for presenting digital data to a transmission line and more specifically to an improved circuit wherein transformer-type coupling may be used to transmit both symmetrical and nonsymmetrical codes.

In known prior art transmission line driver circuits in which the pulse code modulated signal is coupled to a transmission line by way of a transformer, problems arise when an attempt is made to send nonsymmetrical codes due to the storage of energy in the magnetic field of the coupling transformer. For example, when the pulse train being transmitted is unbalanced with respect to a DC baseline, i.e., the voltage-time product of the positive pulses is different from that of the negative pulses, the field in the coupling transformer stores energy, resulting in a shift of the DC baseline. This shift may be sufficiently large so as to cause errors in the data being received at the remote end of the transmission line.

Certain codes, such as non-return to zero (NRZ) and Miller codes are inherently nonsymmetrical. These codes offer an advantage over symmetrical codes, such as phase modulated or frequency modulated codes, in that more information or a higher bit density may be packed into them than can be accomplished with symmetrical codes. Accordingly, it is desirable to be able to transmit such nonsymmetrical code patterns over long transmission lines through the use of transformer coupling between the coded data to be transmitted and the lines themselves.

The present invention provides a transmission line driver circuit which receives as an input, the digital data to be transmitted and which employs transformer coupling to the transmission line. More specifically, first and second transformers are provided which have their secondary windings connected in an opposite sense to the terminals of the transmission line by means of suitably poled diodes. The primary winding of the first transformer is connected between a source of reference potential and a waveform shaping circuit by means of a first transistor. Similarly, the primary winding of the second transformer is coupled between the source of reference potential and a second wave shaping circuit by means of a second transistor. Suitable logic circuits are provided for causing the first and second transistors to be operated in a complementary fashion. That is, when the transistor associated with the primary winding of the first transformer is conducting, the transistor associated with the primary winding of the second transformer is nonconducting and vice versa. In operation, when one transformer is providing the signal (negative or positive), the other transformer has its stored field reduced to zero so that when the transformer is driven to apply a digital pulse to the transmission line it operates from a condition whereby no energy is initially stored in it.

OBJECTS

It is accordingly the principal object of the present invention to provide a novel transmission line driver circuit.

Still another object of the invention is to provide a transmission line driver circuit which may be transformer coupled to the transmission line in such a fashion that nonsymmetrical codes may be transmitted.

Still another object of the invention is to provide a novel transmission line driver circuit which is not subject to problems caused by DC baseline shift.

These and other objects and advantages of the invention will become apparent to those skilled in the art from the following detailed description of the preferred embodiment taken in conjunction with the accompanying drawings in which:

DESCRIPTION OF PREFERRED EMBODIMENT

Figure 1:
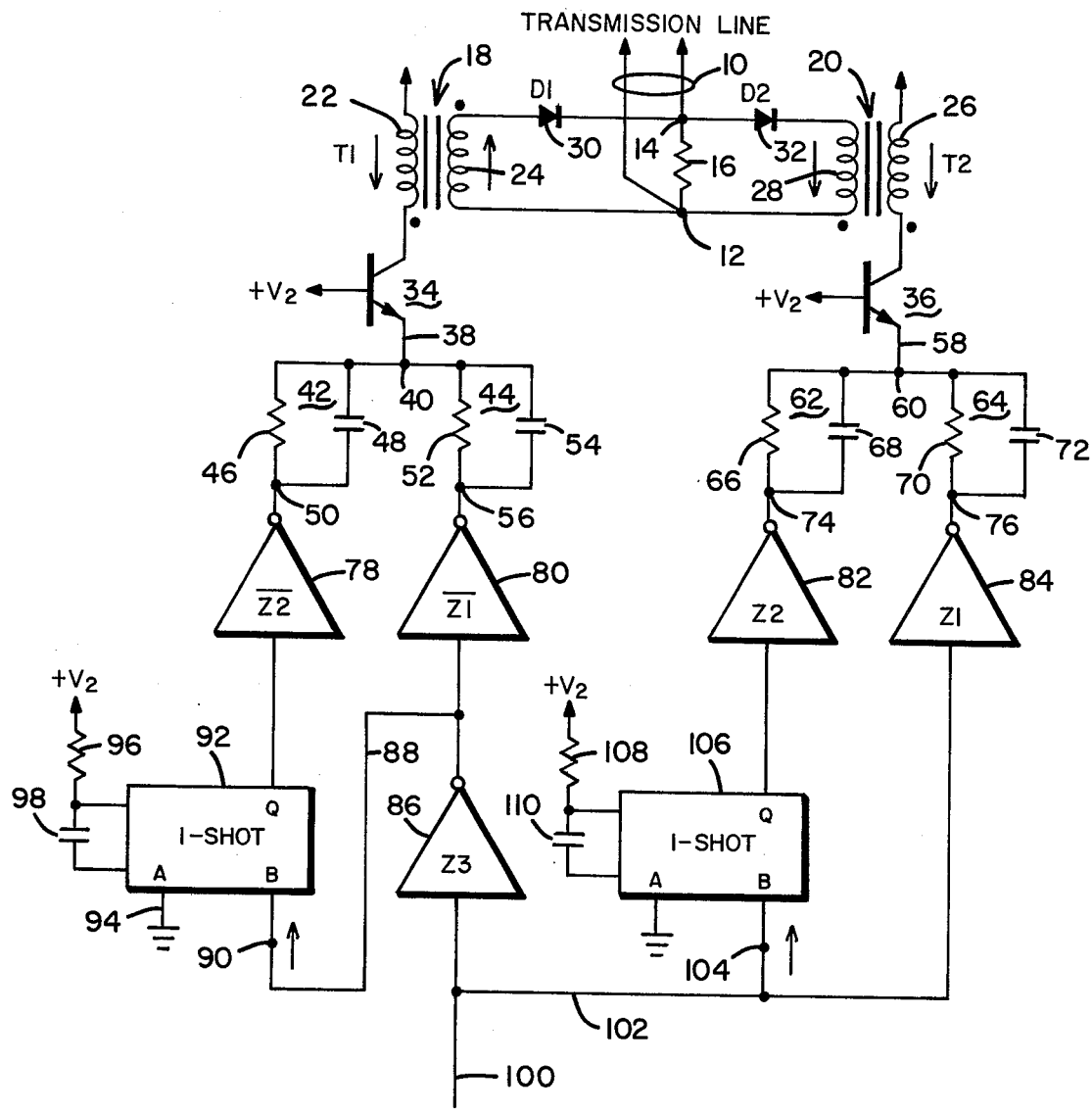
FIG. 1 is a schematic diagram of the preferred embodiment of the invention.

Referring first to FIG. 1, there is shown a segment of a transmission line 10 having first and second input terminals 12 and 14. The transmission line itself may be of the shielded conductor type or any other well known arrangement. Connected between the input terminals is a resistor 16 which is set at a value corresponding to the characteristic impedance $Z_o$ of the transmission line.

First and second transformers 18 and 20 are provided, each having a primary winding and a secondary winding. The primary winding of transformer 18 is identified by numeral 22 and its secondary winding is identified by numeral 24. Similarly, the primary winding of transformer 20 is identified by numeral 26 and the secondary winding of transformer 20 is identified by numeral 28. Connected between a first terminal of the secondary winding 24 and the transmission line input terminal 14 is a semiconductor diode 30. A second such diode 32, poled as shown, is connected between the transmission line input terminal 14 and a first terminal of the secondary winding 28. The remaining terminals of secondary windings 24 and 28 are connected together and to the transmission line input terminal 12. The relative sense of the primary and secondary windings of transformers 18 and 20 is indicated by the standard dot convention, i.e., the dotted terminals are instantaneously of the same polarity.

A first terminal of each of the primary windings 22 and 26 is connected to a source of positive potential $+V_1$ and the other terminals thereof are respectively connected to the collector electrode of transistors 34 and 36. The base electrodes of transistors 34 and 36 are each connected to a source of positive potential $+V_2$.

The emitter electrode of transistor 34 is connected by a conductor 38 to a junction point 40 which is a common point between a pair of parallel RC networks 42 and 44. More specifically, the RC circuit 42 includes a resistor 46 and a capacitor 48 which are connected in parallel between the junction 40 and a junction 50. In like fashion, the RC circuit 44 includes a resistor 52 and a capacitor 54 connected in parallel between junction 40 and a junction 56.

The emitter electrode of transistor 36 is connected by way of conductor 58 to a junction point 60 to which is also connected parallel RC networks 62 and 64. Network 62 includes a parallel combination of resistor 66 and capacitor 68 while network 64 includes a resistor 70 and a capacitor 72. As mentioned, parallel RC networks 62 and 64 each have a first terminal connected to junction 60 and their respective second terminals are identified by numerals 74 and 76.

Connected to junction 50 is the output of an inverter 78 and connected to the junction 56 is the output of an inverter 80. Likewise, an inverter 82 has its output connected to the junction point 74 of RC network 62 and an inverter 84 has its output connected to the junction 76 of RC network 64. The inverter 80 has its input connected to the output of still another inverter 86. The output from inverter 86 is also connected by a conductor 88 to a trigger input terminal 90 of a monostable multivibrator or one-shot circuit 92. A second input terminal to one-shot circuit 92 is identified by numeral 94 and is connected to a source of reference potential such as ground. An external series RC circuit including resistor 96 and capacitor 98 is connected between a voltage source $+V_2$ and the one-shot 92 and allows the period of the one-shot to be adjusted to a desired value.

The pulse modulated input data to be transmitted is applied via conductor 100 to the input of inverter 86 and via conductor 102 to the trigger input terminal 104 of a second one-shot circuit 106 and to the input of inverter 84. Finally, the outputs from the one-shot circuits 92 and 106 are respectively connected to the inputs of the inverters 78 and 82.

Now that the construction and manner of interconnection of the preferred embodiment have been described in detail, consideration will be given to its mode of operation. In doing so, reference will be made to the several waveforms illustrated in FIG. 2.

Referring now to FIG. 2A, there is illustrated a waveform representing a serial binary data train 100011001010111 in non-return to zero recording format. It is immediately apparent that this is inherently a nonsymmetrical code and has an average value or DC baseline which shifts, depending upon the code permutation to be transmitted. In known prior art transmission line driver circuits where a transformer is used to couple the data to be transmitted to the transmission line, this DC baseline shift results in a DC biasing of the transformer and makes the task of accurate recovery of the information at the receiving site more difficult in that zero-crossing detectors may be unable to function to properly sense the transitions of the transmitted waveform. The design of the present invention obviates this problem by providing a means whereby the DC baseline shift will not bias the coupling transformer. This is accomplished by providing two coupling transformers, one for transmitting positive impulses and the other for transmitting negative impulses. During the period that one transformer is operating to apply a pulse to the transmission line, the other is recovering from a previous cycle and vice versa.

When the data train of FIG. 2A is applied to the input data line 100, the waveforms of FIG. 2B through 2H result at various points in the circuit of FIG. 1. For example, at time $t_0$ when the input data signal switches from a binary low to a binary high (L and H) the inverter 86 produces a low output which is applied by way of conductor 88 to the input terminal 90 of the one-shot circuit 92. The design of the one-shot circuit is such that it does not respond to a low input signal, but only to a high signal. The output from the one-shot 92 therefore remains low, causing inverter 78 to output a high signal on junction point 50. The high input signal on conductor 100 after passing through inverters 86 and 80 also causes a relatively high signal to appear at junction point 56. The high signal is set at a value more positive than the voltage $+V_2$ applied to the base of the transistor 34, such that transistor 34 remains nonconducting and no current flows from the source $+V_1$ through the primary winding 22 of transformer 18. The high signal appearing on conductor 100 is applied by way of conductor 102 to the input terminal 104 of the one-shot circuit 106. As was mentioned earlier, the one-shot circuits employed are responsive only to high signals applied to their input terminals and as a result the output from the one-shot 106 switches to its high value and remains there for a predetermined period of time established by the parameters of the resistor 108 and the capacitor 110. Following the conclusion of this time period, the output from the one-shot 106 will again assume its binary low value. With binary high signals being applied to the inputs of inverters 82 and 84, the signals appearing at junctions 74 and 76 will both be low initially. With low signals at the junctions 74 and 76, transistor 36 will be forward biased and a current will flow from the source $+V_1$ through the primary winding 26 of transformer 20, through the collector-to-emitter path of the transistor 36 and will split between the RC networks 62 and 64. The waveform of the current flowing through the primary winding 26 is represented by the waveform in FIG. 2F. Following the delay period established by one-shot circuit 106, the inverter 82 will output a high signal which reduces the amplitude of the current flowing through the primary winding 26 to a value $I_2$ established by the resistance value of the resistor 70.

With the winding sense of the primary and secondary windings of transformer 20 being as indicated in the drawing of FIG. 1 by the dot convention, the sudden surge of current through the primary winding occurring at the time $t_0$ causes output terminal 12 to be relatively positive with respect to output terminal 14. As such, the diode 32 is forward biased and acts as a low impedance. At the time that the one-shot circuit 106 reverts to its low state (time $t_1$) and the junction point 74 goes high, the current flowing through the primary winding 26 suddenly drops to the value $I_2$ established by the potential source $+V_1$ and the resistor 70. The voltage induced in the secondary winding 28 of transformer 20 at this time causes the diode 32 to be reversed biased and in a high impedance condition. Because the recovery time of the transformer is proportional to the ratio L/R, where L is equal to the inductance of the secondary winding and R is the equivalent series resistance of the load resistor 16 and the reversed biased diode 32, it can be seen that the switching of the diode 32 to its high impedance state markedly shortens the recovery time of the transformer and eliminates the occurrence of the otherwise expected reverse voltage transient spike in the output waveform. At time, $t_2$, the input signal drops from a high level to a low level as illustrated in waveform A of FIG. 2. This low signal, when applied to the input terminal 104 of the one-shot circuit 106 is ineffective to toggle the one-shot circuit to its unstable state. Hence, the input of the inverter 82 remains low so that the output therefrom appearing at junction 74 remains high. The low signal applied to the input of inverter 84 causes junction 76 to assume its high value, thereby turning off the transistor 36 and stopping the flow of current through the primary winding 26 of transformer 20. This is depicted in waveform F of FIG. 2.

The low signal applied as an input to the inverter 86 causes a high signal to be applied to the input terminal 90 of one-shot circuit 92. The high signal applied to this input is effective to toggle the one-shot 92 to its unstable state and to thereby apply a high signal as an input to the inverter 78 for a period of time determined by the parameters of the resistor 96 and the capacitor 98. Thus, for the duration of the unstable period of the one-shot 92, the signal appearing at junction point 50 will be low. The high output from inverter 86 is inverted by circuit 80, causing a relatively low signal to appear at the junction point 56. Since the potentials appearing at junctions 50 and 56 are simultaneously low, transistor 34 will be conductive and a current will flow from the source $+V_1$, through the primary winding 22 of transformer 18, through the collector-to-emitter path of the transistor 34 to the junction point 40. Here, the current divides with a first portion flowing through the parallel RC network 42 and a second portion flowing through the parallel RC network 44. The amount of current flowing through the respective parallel paths is, of course, determined by the relative impedance of the two networks 42 and 44.

After a time interval, $t_3$, (FIGS. 2, B&D) which is short relative to the time for one bit of data to be transmitted, the one-shot circuit 92 will automatically revert to its normal stable state, causing a low input signal to be applied as an input to the inverter 78. The resulting high output signal appearing at junction 50 causes a decrease in the amount of current flowing through the primary winding 22 of transformer 18. The current which continues to flow is determined primarily by the ohmic value of resistor 52. The waveform of the current flowing through the primary winding of transformer 18 is represented by waveform G in FIG. 2.

By observing the polarity markings on the primary and secondary windings of transformer 18, it can be seen that when the signals appearing at junctions 50 and 56 simultaneously go low, the diode 30 will be forward biased and transmission line input terminal 14 will become positive relative to the input terminal 12. However, when the one-shot circuit 92 reverts to its stable condition causing a high signal to appear at junction 50, the diode 30 will become reversed biased to cause the transformer 18 to rapidly recover and to eliminate the reverse voltage transient signal which would otherwise appear across the load 16.

Figure 2:
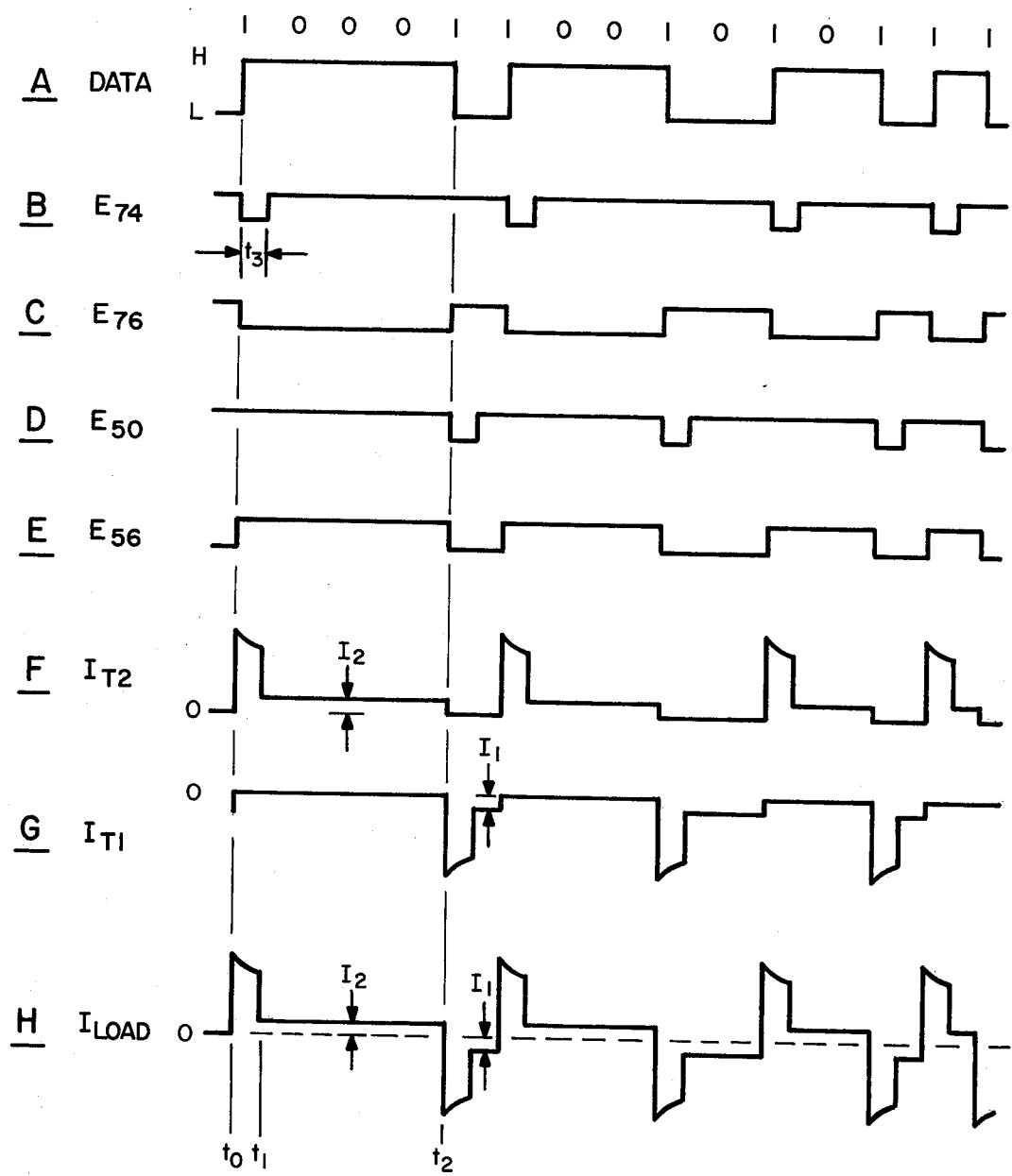
FIG. 2 illustrates certain nonsymmetrical code representations of digital values to be transmitted along with waveforms of signals appearing at various points in the circuit of FIG. 1.

Waveform H of FIG. 2 represents the current flowing through the load 16. It will be noted that transformer 20 is effective to produce the positive component of the wave to the transmission line while transformer 18 contributes the negative component. Also, at the time that transistor 34 is conducting, transistor 36 is non-conducting and vice versa. Hence, at the time that one transformer is contributing its component to the output, the other transformer is recovering in anticipation of its subsequent turn in generating an output component. Thus, neither transformer has energy stores in it when its turn comes to provide the signal to the transmission line.

The component values of the parallel RC waveshaping networks 41 and 62 are selected so as to produce a sharp rise time in the output waveforms and, as such, the time constant of these two networks should be short compared to the unstable period of the one-shot circuits 92 and 106. The ohmic values of the resistors 51 and 70 in the parallel RC networks 44 and 64, respectively, determine the current levels $I_1$ and $I_2$ illustrated in waveform H of FIG. 2. The reason that it is desirable to maintain a current flow through the operative one of the two primary windings 22 or 26 is to insure error free detection of the transmitted data at the receiving end of the transmission line. In many instances the receiver circuits employ so-called "zero-crossing" detectors for determining the transitions of the received waveform. That is, each time the excursions of the transmitted waveform cross the zero volt baseline, it is detected by the receiver circuits and utilized to reconstruct the transmitted data. In the presence of noise on the line, it is possible that erroneous data reconstruction will occur if the noise signal crosses the zero threshhold. By providing the current levels $I_1$ and $I_2$, any noise is displaced from the zero axis by a predetermined amount sufficient to prevent unintentional cross-overs and therefore errors in the received data.

Although the present invention has been described to a certain degree of particularity, it should be understood that the present disclosure had been made only by way of example and that numerous changes in the details of circuitry and the combination and arrangements of parts and elements (some of which have been suggested) may be resorted to without departing from the scope and spirit of the present invention.

What is claimed is:

1. A transmission line driver circuit comprising in combination:
   a. first and second transformers, each having a primary winding and a secondary winding, said secondary windings of said first and second transformers being connected through unidirectional current conducting means to first and second output terminals and in opposite winding senses with respect to their respective primary windings;
   b. a load impedance connected between said first and second output terminals;
   c. first and second waveshaping networks;
   d. first and second semiconductor current switching means, said first semiconductor current switching means being individually connected between the primary winding of said first transformer and said first waveshaping network and said second semiconductor current switching means being connected between the primary winding of said second transformer and said second waveshaping network; and
   e. digital logic circuit means adapted to be connected to a source of digital signals to be transmitted for simultaneously applying signals representative of the true and complementary values of said digital signals individually to said first and second waveshaping networks said digital logic circuit means being coupled to said first and second semiconductor current switching means for causing said first semiconductor current switching means to conduct when said digital signals are of a first binary significance and said second semiconductor current switching means to conduct when said digital signals are of a second binary significance.

2. Apparatus as in claim 1 wherein said first and second waveshaping networks each comprise first and second parallel resistance-capacitance circuits having first and second terminals, where said first terminal of said first and second parallel resistance-capacitance circuits of said first waveshaping network are connected to said first semiconductor current switching means and said first terminal of said first and second parallel resistance-capacitance circuits of said second waveshaping network are connected to said second semiconductor current switching means, and where said second terminals of said first and second parallel resistance-capacitance circuits of said first and second waveshaping networks are connected to said digital logic circuit means.

3. Apparatus as in claim 2 wherein said digital logic circuit means comprises:
   a. first and second monostable multivibrator circuits, each having an input terminal and on output terminal, responsive to signals of a first binary significance applied to said input terminals for producing a signal of the same binary significance at said output terminals only for a predetermined time period;
   b. means for coupling the true value of said digital signals to be transmitted to said input terminal of said first monostable multivibrator circuit and the complement value of said digital input signals to be transmitted to said input terminal of said second monostable multivibrator circuit;
   c. first and second inverter circuits individually connected at their inputs to said output terminals of said first and second monostable multivibrator circuits and at their outputs to said second terminals of said first parallel resistance-capacitance circuits of said first and second waveshaping networks; and
   d. third and fourth inverter circuits individually connected at their inputs to said input terminals of said first and second multivibrator circuits and at their outputs to said second terminals of said second parallel resistance-capacitance circuits of said first and second waveshaping networks.

4. Apparatus as in claim 3 wherein said predetermined time period is short compared to the bit time of the digital signals to be transmitted.

5. Apparatus as in claim 3 wherein the time constant of said first parallel resistance-capacitance circuits of said first and second waveshaping networks is short relative to said predetermined time period.

* * * * *